March 2, 1943.   A. W. EVEREST   2,312,888
MAGNETOSTRICTION MEASURING APPARATUS
Filed May 31, 1941   2 Sheets-Sheet 1

Inventor:
Alfred W. Everest,
by Harry E. Dunham
His Attorney.

March 2, 1943.   A. W. EVEREST   2,312,888
MAGNETOSTRICTION MEASURING APPARATUS
Filed May 31, 1941   2 Sheets-Sheet 2
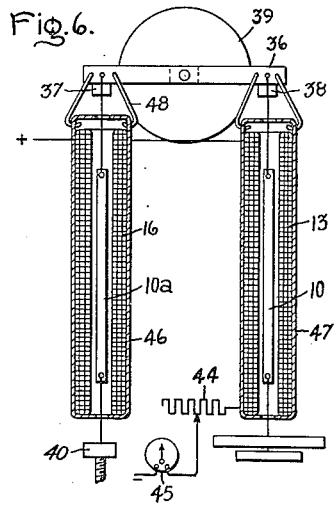
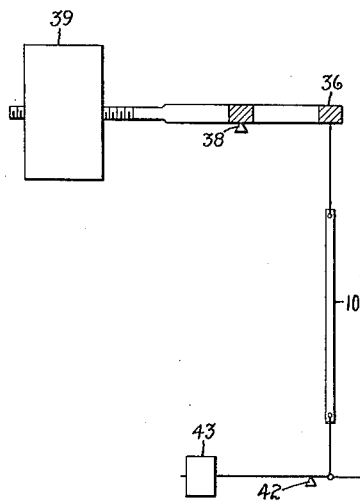
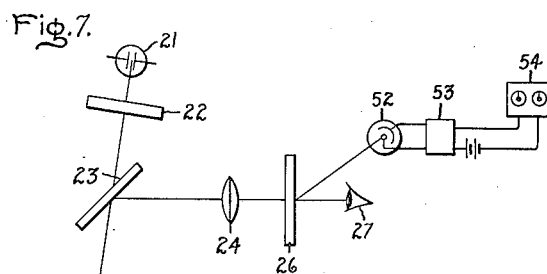
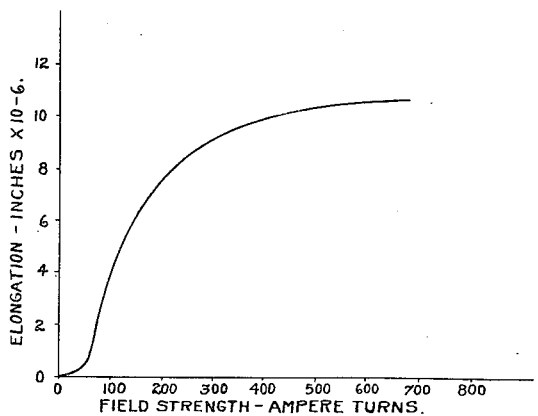
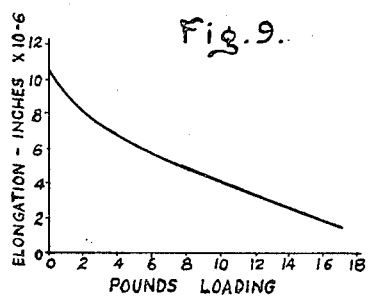
Inventor:
Alfred W. Everest,
by Harry E. Dunham
His Attorney.

Patented Mar. 2, 1943

2,312,888

UNITED STATES PATENT OFFICE 2,312,888

MAGNETOSTRICTION MEASURING APPARATUS

Alfred W. Everest, Pittsfield, Mass., assignor to General Electric Company, a corporation of New York Application May 31, 1941, Serial No. 395,979

2 Claims. (Cl. 73—51)

My invention relates to apparatus for measuring magnetostriction in a simple and reliable manner.

Figure 1:
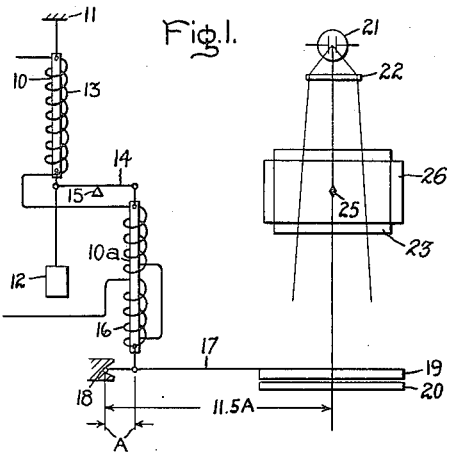
Figure 2:
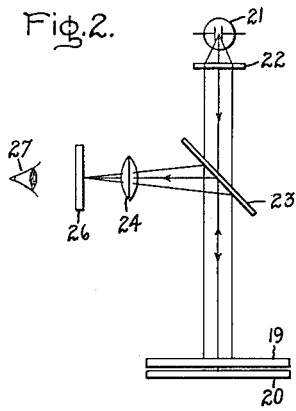
Figure 3:
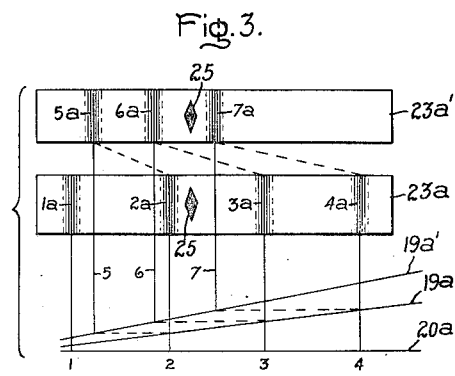
Figure 4:
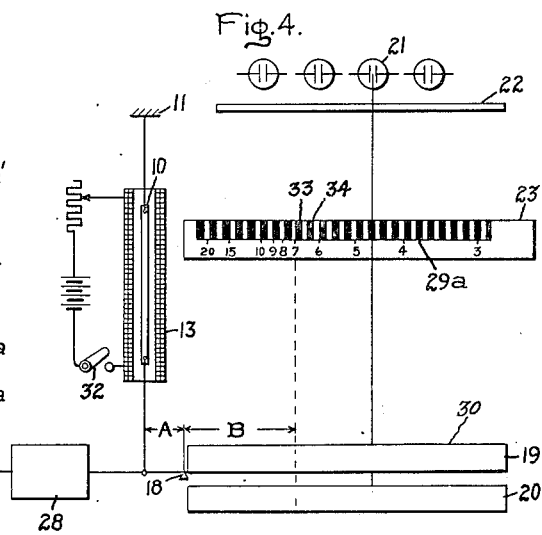
Figure 10:
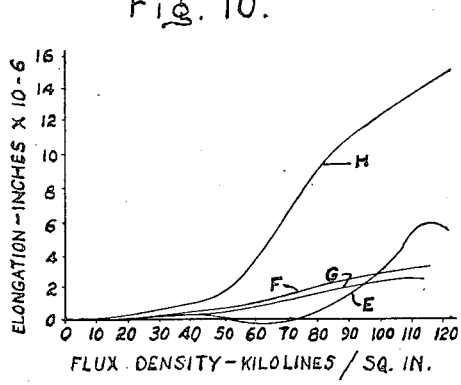
Figure 5:
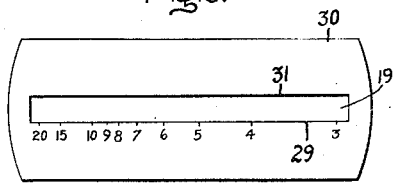

The features of my invention which are believed to be novel and patentable will be pointed out in the claims appended hereto. For a better understanding of my invention, reference is made in the following description to the accompanying drawings in which Fig. 1 represents a schematic side view of a magnetostriction measuring apparatus embodying my invention. Fig. 2 is a view of the light ray system taken at right angles to Fig. 1. Fig. 3 is an explanatory diagram of the nature of the change in light interference pattern obtained in a measurement. Fig. 4 represents a simplified embodiment of my invention. Fig. 5 represents a top view of the upper plate 19 of Fig. 4 with a scale placed thereon. Figs. 6 and 7 are partially sectioned views taken at right angles to each other of a preferred embodiment of my invention for measuring magnetostriction. Fig. 8 is a magnetostriction curve of a sample of magnetic material. Fig. 9 is a curve showing how magnetostriction is reduced by tension. Fig. 10 shows magnetostriction curves of various transformer steels.

Referring to Fig. 1, I have represented at 10 a sample of magnetic steel, such as is used in transformers, in position for determining any change in its length that may be caused when the sample is magnetized. Such information is valuable in connection with magnetic materials used in electrical apparatus. For example, a transformer part made with steel which is subject to considerable magnetostriction is more likely to be noisy in use due to vibration than one which is made with a steel of low magnetostriction. Such changes in dimensions due to magnetostriction are, however, too minute to be accurately measured by ordinary means. The sample 10 in lamination form is supported under some desired tension in a vertical direction between a stationary support 11 and a weight 12. A coil 13 is provided for magnetizing the sample, such coil being supported so as to avoid contact with the sample. The change in length of the sample caused by magnetization thereof is conveyed to a horizontal lever 14 pivoted at 15, and through a vertical member 10a to a second horizontal lever 17 pivoted at 18. 10a is a sample like the sample 10. Sample 10a, however, has a non-inductive winding 16 thereon which winding is energized in series with coil 13 in order that any elongation of sample 10 due to heating by the current of magnetization will be compensated for by an equivalent heating of sample 10a. The lever 14 is pivoted at its center so that elongations due to equal heating of the two sample parts of the lever system will not cause any movement of lever 17. The fulcrum 15 of lever 14 may be slightly adjusted to compensate entirely for residual temperature effects. Winding 16 is likewise supported so as not to contact with the lever system and since it is wound to be noninductive, it will produce no magnetization of sample 10a. The movement conveyed to lever 17 will therefore be that caused only by magnetostriction of sample 10.

Secured to the otherwise free end of lever 17 is a transparent optically flat plate 19 having a partially reflecting under surface and beneath it is a stationary optically flat plate 20 having an upper reflecting surface. It will now be apparent that the variation in displacement between adjacent points on the two reflecting surfaces is proportional to the measurement desired.

Above the plates 19 and 20 is a substantially monochromatic light source 21. For example, an ordinary neon glow lamp is satisfactory since it gives a predominant wavelength in the yellow range at 5852 Angstroms or almost exactly 23 millionths of an inch. This produces an interference pattern of alternate bright yellow and dark lines, such that measurements are directly based on the yellow line of a wavelength of 5852 Angstroms. A sodium lamp which gives a bright yellow line at 5890 Angstroms may also be used. At 22 is a ground glass plate to disperse the light from lamp 21 to give a larger and more uniform image area on the plates 19 and 20 which is easier to observe than the image of the glow tube alone. Light thus falls upon the plates 19 and 20. Part of the light is reflected upward from the under surface of plate 19. The balance is transmitted to and partially reflected from the upper surface of plate 20. Thus light rays are reflected upward from the two adjacent reflecting surfaces which have a spacing which varies with the measurement under investigation.

It is well known from physics that when two optically flat surfaces are placed relatively close together with a wedge of air between and then illuminated with a monochromatic source of light, the phenomena of interference will occur resulting in dark interference lines wherever the separation between the two surfaces is any odd number of quarterwaves.

Where the surfaces are one-half wavelength or any multiple thereof apart, there will be no interference because then the light which passes to the lower reflecting surface travels down and back one or more full wavelengths farther than the light reflected from the upper surface and the rays striking the screen are in phase.

For convenient observation a diagonal of transparent plate glass is placed at 23, Fig. 2, reflecting the returning light through a projecting lens 24 which focuses the image on a ground glass screen 26 where it is observed by the operator, represented by the eye 27. The light which is reflected from the upper surface of reflector 20 travels farther than that reflected from the lower surface of plate 19 by an amount equal to twice the distance between such surfaces at any given point.

Fig. 3 is a schematic explanatory diagram where 20a represents the upper reflecting surface of plate 20 and 19a and 19a′ represent the lower reflecting surface of plate 19 in two different positions. 23a represents the interference pattern observed on screen 26 for the position of plate 19 designated 19a, and 23a′ represents the interference pattern observed on screen 26 for the position of plate 19, designated 19a′. In this representation the angles between the reflecting surfaces 19a and 20a, the spacing between them and the assumed wave length of the light rays involved have been chosen arbitrarily for representation purposes only and are in general greatly exaggerated. Actually the reflecting surfaces are so nearly parallel as to appear to be parallel. Also, it is assumed that only small sections of the reflecting surfaces and screen are represented. With the spacing 19a—20a it is assumed that maximum light interference occurs at the points marked 1, 2, 3, 4. That is, the distance between 19a and 20a at point 4 is, say seven quarter-wave lengths and gives rise to the dark line 4a on the screen 23a, the distance between 19a and 20a at point 3 is five quarter-wavelengths and gives rise to the dark line 3a, etc. Between the dark lines the color changes to bright yellow.

If, now, the upper reflecting surface be considered as moved from 19a to 19a′ the points of maximum interference will move to the left and be closer together on the scale screen. Thus the points of interference occur on lines 5, 6 and 7. That is, the distance between 19a′ and 20a at line 7 is the same as the distance between 19a and 20a at line 4, and the corresponding dark line of interference representation has moved from 4a to 7a on the screen. The interference which occurred on line 3 and represented by 3a has moved to line 6 and is represented by line 6a on the screen, etc. 25 represents a reference point or target which is marked on screen 26 and by means of which the amount of change which occurs with movement of plate 19 can be observed. It is seen that in the change assumed a dark line has moved to the left past target 25 and by estimation there has been a shift to the left of about one and one-half lines. In a preferred arrangement of my apparatus a shift of one dark or bright line on the scale at the target 25 represents a change in length of one millionth of an inch. Thus, the measurement just explained may represent .0000015 inch change in the length of sample 10, Fig. 1.

This relationship may be accomplished as follows for the neon light used. The shift of one light and one dark band past the reference point, which may be termed a unit shift, represents a change in spacing between the plates of one-half wavelength of light or .0000115 inch. If now, I make the mechanical amplifying motion of the lever 17 equal to 11.5 by making the ratio of the arms of lever 17, Fig. 1, A and 11.5A as represented, the above calibration result is accomplished. Likewise by making the ratio 1/1.15, a shift of one dark and one bright line past the reference point would correspond to .00001 inch. The direction of the band shift past reference point 25 indicates whether the sample under test is contracting or expanding. A left shift as above explained represents expansion.

It is apparent from the above description that the apparatus is simple to build, calibrate and operate. The direction of pressure on all of the pivots and fulcrums of the lever system does not change and hence there is no lost motion error to consider.

Where magnetic samples are tested rapidly such that the temperature of the sample does not have time to change as where the magnetostriction tests are made to see if samples fall within a given range, the temperature compensating feature may be omitted and the apparatus simplified to the form shown in Fig. 4, where parts corresponding to those used in the apparatus of Fig. 1 are indicated by like reference characters. In Fig. 4, 28 may be an adjustable spring or counterweight which maintains a desired tension on sample 10.

In Fig. 4 I have shown a 45° reflecting mirror 23 of considerable length and a plurality of neon lamps 21 above the long ground or opalescent glass plate 22. The purpose of this is to be able to observe the interference pattern extending over a considerable scale range in a direction at right angles to the pivot 18 over the plates 19 and 20 in relation to a scale 29 which is laid on the upper surface of plate 19 as shown in Fig. 5. As a matter of fact I may cover the upper surface of plate 19 with paper 30 having an elongated slit 31 therein and adjacent to one edge of which the scale 29 is marked on the paper. The 45° mirror 23 will reflect the scale 29 and adjacent interference pattern in slit 31 to the eye. Thus in Fig. 4, 29a represents the reflection of scale 29 on plate 23 and the interference pattern will appear just above it as represented. (Actually the scale 29 must be inverted to offset the reversal effect of mirror 23, but it has been drawn as shown for clarity in explanation.)

As pointed out in connection with Fig. 3, the spacing of the dark and bright lines of the interference pattern not only shift when a change in the spacing of plates 19 and 20 occurs but it will be noted that as the angle of spacing increases, the interference lines move closer together. If the change is caused quickly as where the switch shown at 32, Fig. 4 is closed to suddenly magnetize the sample 10 to approximately the limit of magnetostriction change, there may be one or more points along the scale 29 where one interference line will appear to stand still and adjacent lines on both sides of this line appear to approach or recede from this line when the field is applied and the sample 10 elongated and the plates 19 and 20 separated to another angle. If the apex of the angle between 19 and 20 is in the direction of pivot 18 the lines adjacent to the stationary line appear to approach it when sample 10 elongates. If the field is quickly removed the interference lines will appear to move in the opposite sense from the point on the scale where the one line appears to stand still. This is an optical illusion and the point on the scale where a line appears to stand still is that point where one line is exactly replaced by the next adjacent interference line when the change is made. For example, in Fig. 4 consider the interference lines designated 33 and 34; if line 34 moves to the position of line 33 when switch 32 is closed, 7 on the scale will be the point where the lines appear to stand still. The lines on both sides of this point will appear to converge towards it. This is a definite and easily observed phenomenon and is utilized with a suitably calibrated scale and relation of lever arms for directly reading the measurement in millionth inches. For example, point 7 on the scale is that point where a complete shift of one dark or bright line corresponds to a change in length of the sample .000007 inch calculated from the lever arm ratio to this point and the wave length of light used as follows:

$$B = \frac{11.5A}{7}$$

where B and A are the lever arms represented in Fig. 4 and 11.5 is one-half a wavelength of the light used expressed in millionths of an inch. Thus $$\frac{A}{B} = \frac{7}{11.5}$$

for point 7. For point 5 on the scale the ratio is $$\frac{A}{B} = \frac{5}{11.5}$$

etc. This is because the length of arm B changes along the scale for different scale values. The scale shown is suitable for the quick determination of the magnetostriction of samples of magnetic steel four inches in length at a given flux density. The switch 32 should remain closed only long enough for the current to rise to full value and the reading noted and the switch should be opened before there is any appreciable change in temperature of the sample.

For very accurate magnetostriction measurements I prefer to employ the arrangement represented in Figs. 6 and 7, which is a more refined form of the apparatus of the type shown in Figs. 1 and 2. In Fig. 6 the sample 10 to be tested and the temperature compensating strip 10A are both suspended from a beam 36, which beam forms one end of the lever pivoted at its sides at 37 and 38 and provided with an adjustable counterweight 39. Temperature compensating strip 10a is fastened at its lower end to a stationary adjustable support 40. The lower end of the sample 10 to be tested is secured to the lever 41 pivoted at 42 and carrying an adjustable counterweight 43 at one end and the lower optical flat 49 at the other. The non-inductive winding 16 for heating strip 10a and the inductive coil 13 for magnetizing sample 10 are connected in series with a direct current source of supply, a rheostat 44 for adjusting the current and an instrument 45 for measuring the current. The coils are supported in casings 46 and 47 for minimizing and equalizing thermal effects. These casings are preferably darkened on the interior and made light reflecting on the exterior and are supported with the windings free of the parts 10 and 10a by being suspended from the beam 36 by suitable links shown at 48. Casing 46 is preferably made of magnetic material so as to shield strip 10a from any leakage flux that might emanate from inductive winding 13. Casing 47 is, however, preferably made of non-magnetic material such as brass so as not to affect the magnetization of sample 10. It will further be noted that strip 10a is under considerable tension due to the upward pull created by the lever and its counterweight 39. This tension is preferably sufficient to prevent any magnetostriction change in strip 10a even if it should be subject to any stray magnetic field. The upper lever with its cross beams and double pivots 37 and 38 at its edges is of solid massive construction so as not to twist or otherwise change in shape so as to interfere with the measurement results. It will now be evident that any elongation of parts 10a and 10 due to temperature changes will be equal and such change will be taken up by the upper lever system so that there is no movement of lever 41 due to temperature changes. There is only a slight tension on sample 10 sufficient to take up any lost motion in the linkage and cause optical plate 49 to have a movement proportional to the change in length of sample 10 due to magnetostriction. In this modification the upper optical plate 50 is made stationary and this plate is preferably made somewhat larger than the lower plate 49 to protect the reflecting upper surface of plate 49 from dust conditions. I also prefer to bevel the upper surface of the upper plate 50 so that light that may be reflected from its upper surface will be reflected at an angle as indicated by line 51 and hence will not return along the line of the reflected rays which are utilized for measurement indication purposes. Light reflected from the upper surface of 50 would otherwise impair the clearness of the measurement interference pattern. The light source 21, the diffusing plate 22, and the reflector plate 23 are positioned on a line such that the light rays after being refracted through the beveled upper surface of plate 50 will be substantially perpendicular to the measurement surfaces on the top of plate 49 and the bottom of plate 50. In all of the modifications described the material of the optical plates such as 49 and 50 will be of pyrex glass or quartz having a negligible temperature coefficient of expansion. Other parts not specifically mentioned will be made of materials and of dimensions suitable for the purpose and will be provided with leveling adjustments and the like conforming to good practice but which do not need to be gone into for an understanding of the invention.

It will be understood that a considerable portion of the useful light from source 21 is lost and that only a fraction thereof reaches plate 26 due to only partial reflection from different surfaces. However, the interference pattern of bright and dark lines is nevertheless remarkably clear and the apparatus can be used in an ordinarily lighted room without special light shading expedients.

The apparatus of Figs. 6 and 7 is used by counting the shift of interference lines either the dark or the light lines past a reference point. I may count this shift by an artificial eye, such as a photoelectric cell, and in Fig. 7 I have shown a photoelecric cell 52 positioned so as to be influenced by shift of alternate bright and dark lines across the plate 26. The impulses thus produced may be amplified by an amplifier 53 and employed for various suitable purposes. In Fig. 7 I have represented a counter 54 energized from the amplifier.

Fig. 8 shows an elongation flux density curve of a sample of magnetic material from data obtained by the use of my measuring device. The sample tested was a lamination five inches in length and one inch wide and the curve shows that it increased in length by slightly over eleven millionths of an inch when subjected to a fluid strength of about 700 ampere turns.

The curve of Fig. 9 is of a sample of magnetic material of the same dimensions showing the decrease in magnetostriction with an increase in tension on the sample. The curve was taken with the sample subject to a constant magnetic field of 685 ampere turns. At zero pounds-loading it had an elongation due to the magnetic field of eleven millionths inch. However, such elongation is reduced as tension on the sample is increased, as shown. It appears from curves of Figs. 8 and 9 that if the piece 10a, Fig. 6, is placed under considerable tension as represented, it will have a negligible elongation due to any small leakage flux which may be introduced therein, both by reason of the low flux density and because any elongation that might otherwise be caused thereby is eliminated by tension. The apparatus of Fig. 6 is therefore temperature compensated and the temperature compensating strip 10a is compensated for leakage flux magnetostriction and the reliable results obtained by such apparatus bears out this assertion.

Fig. 10 shows magnetostriction curves for four different steels that have been used in transformers. Curve E shows no appreciable magnetostriction either elongation or contraction until the flux density is raised above 75 kilolines per square inch. Curves F and G show a slow rise in elongation from about 30 kilolines per square inch upward. Curve H shows a very material elongation amounting to ten millionths of an inch at 80 kilolines per square inch and still increasing at a rapid rate. If other properties are the same the suitability of the steels for use in alternating current apparatus such as transformers, dynamo electric machines, etc., would be in the order E, F, G, and H for flux densities below about 100 kilolines per square inch. In particular, the steel having magnetostriction properties shown by curve H should not be used as it is likely to produce considerable vibration and noise.

It will be evident that the apparatus which has been described for measuring magnetostriction may be used for measuring minute changes in dimensions of materials due to other causes. For example, the apparatus of Fig. 6 may be used for measuring the elongation of a sample 10a at various loadings of the counterweight at 39, the windings 16 and 13 remaining deenergized. By leaving coil 13 deenergized and energizing coil 16 the temperature coefficient of expansion of sample 10a may be obtained. The calibration of the apparatus would be changed to suit the measurement being made.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. Apparatus for measuring magnetostriction comprising dimension measuring means having a movable member which in response to the desired measurement, a lever system including a sample of magnetic material to be tested for magnetostriction and a similar sample, said lever system being connected between a stationary support and said movable member, a magnetizing coil for the sample to be tested, a non-inductive coil for said similar sample, means for energizing both coils simultaneously to magnetize the sample to be tested and to similarly heat both samples, said lever system being so arranged that similar changes in dimensions of both samples cause no movement of the movable member but dissimilar changes in dimensions of both samples do move the movable member whereby the apparatus is compensated for temperature variations of the sample under test caused by the heating effect of its magnetizing coil.

2. Apparatus for measuring magnetostriction comprising dimension measuring means having a movable member which is moved in response to the desired measurement, a lever system secured between a stationary support and said movable member, said lever system including elongated link tension members made of similar test and compensating samples of magnetic material, a magnetizing coil for the test sample and a non-inductive coil and a stray flux shield for the compensating sample, means for energizing said coils to magnetize the test sample and produce similar heating effects in both samples and means for tensioning only the compensating sample to near its magnetostriction limit whereby stray flux therein will produce little magnetostriction thereof, said lever system being so arranged that only unequal elongations of the samples produce movement of said movable member whereby the compensating sample compensates for changes in temperature of the test sample due to flow of magnetizing current in its coil and the compensating sample is not subject to magnetostriction.

ALFRED W. EVEREST.

CERTIFICATE OF CORRECTION.

Patent No. 2,312,888. March 2, 1943.

ALFRED W. EVEREST.

It is hereby certified that error appears in the printed specification of the above numbered patent requiring correction as follows: Page 4, first column, line 2, for "fluid" read --field--; line 52, for "variou" read --various--; and second column, line 15, after the word "which" insert --is moved--; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.